S. C. Rundlett,
Sand Sieve.
N° 63,180. Patented Mar. 26, 1867.
Fig: 1.
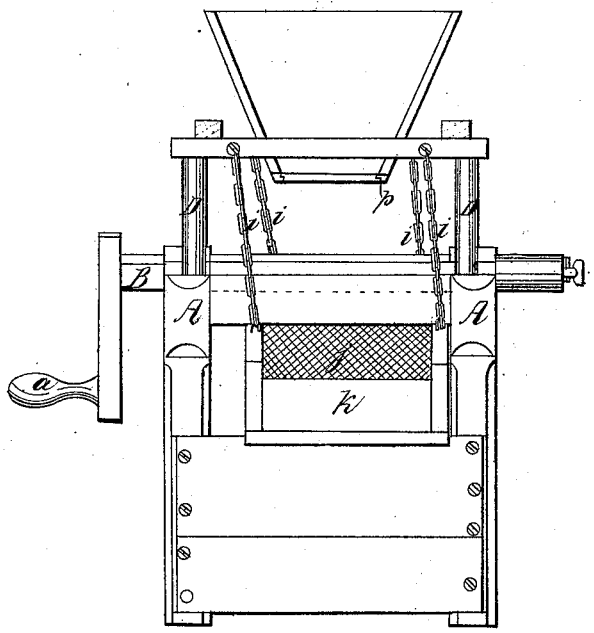
Fig: 2.
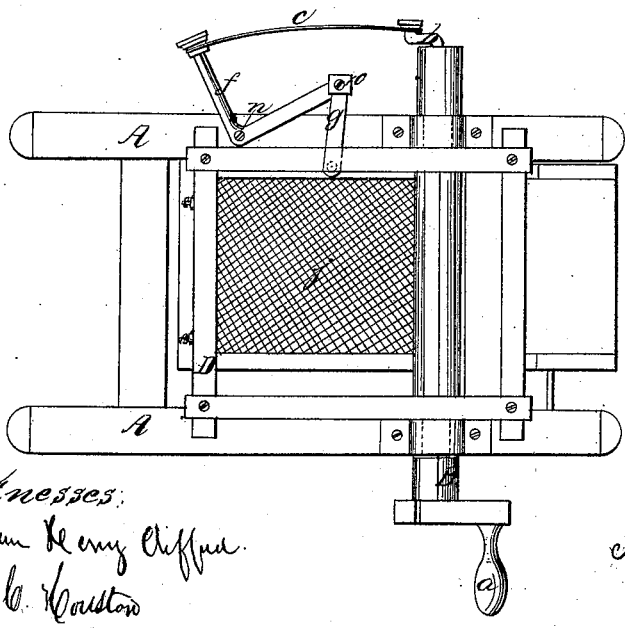
Witnesses:
William Henry Clifford
Henry C. Houston
Inventor;
Samuel C. Rundlett

United States Patent Office.

SAMUEL C. RUNDLETT, OF PORTLAND, MAINE.

Letters Patent No. 63,180, dated March 26, 1867.

SIFTER FOR SAND, &c.

*The Schedule referred to in these Letters Patent and making part of the same.*

TO ALL WHOM IT MAY CONCERN:

Be it known that I, SAMUEL C. RUNDLETT, of Portland, in the county of Cumberland, and State of Maine, have invented a new and useful Improved Sifter; the sieve being more particularly intended for sifting sand for the purpose of mixing mortar; and I hereby declare the following to be a full, clear, and exact description thereof, which will enable others to make and use my invention, reference being had to the accompanying drawings, forming part of this specification, in which—

Figure 1 is an end elevation of my invention.

Figure 2, a top plan and view of the same.

The operating parts of my invention are set upon a frame, seen at A in the drawings. Upon two of the horizontal beams of this frame is set the shaft B, with its crank $a$ by which it is turned. Upon the other end of the shaft B are attached the following devices: crank $b$, connecting-rod $c$, bell-crank $f$, and arm $g$. An additional and smaller frame is placed upon the one already described; this is seen at D. Into this is set the hopper $h$, as seen in fig. 1. Upon two of the horizontal beams of the frame D are suspended the four chains or rods $i$, to which, at their lower ends, is attached a sieve, $j$. This sieve can thus be easily swung from side to side, being made somewhat narrower than the width of the frame A. The arm $g$ is attached to the sieve at the centre of one of its sides, (see fig 2.) The object of this is to give the sieve a lateral motion, and so that it will strike at every movement on the inner sides of the frame A. $k$ shows the mouth of the sifter somewhat inclined, as is the whole of the sifter, and made of solid material, as wood, for instance. The operation of my invention is as follows: Turn the shaft by the crank $a$; this draws backward and forward the connecting-rod $c$, which in its turn moves the bell-crank $f$ on its pivot $n$. The bell-crank being connected with the arm $g$ at $o$ is moved inward and outward alternately, and thus swings the sifter from side to side, striking each side of the frame A as before specified. Thus the sand will be shaken through the interstices of the sieve, while the gravel and coarser particles following the inclination of the sieve bottom, will roll forward to the mouth of the sieve and drop to the ground from the mouth at $k$. It is evident by the use of proper gear that greater rapidity of motion can be imparted to the sieve. A slide is constructed in the bottom of the hopper to regulate the supply of sand, &c., to the sieve. I do not claim a dumping or tilting sieve, provided with a movable tail-piece, so arranged that the tipping of the sieve opens the side thereof for the passage of the substance sifted; neither do I claim a combination of two scrolls and two cams to give a backward and forward motion to the sieve; neither do I claim a series of sieves in combination with suitable mechanism for imparting a shaking motion to the same, which described devices are exhibited in Patents No. 26,474, December 20, 1859, and No. 53,295, March 20, 1866, respectively. My invention differs from these in the following particulars, viz, that the sieve $j$ is suspended by four rods or chains $i$, that it is swung from side to side, and at each motion is struck against the inner side of the frame A, as before specified, the object of which is to accelerate the passage of the sand through the sieve as well as the progress of the coarser particles down the inclined bottom of the sieve until they fall therefrom to the ground. I am not aware of the existence of any sieve thus suspended from its four corners and thus operating, without the employment of a pivot or some equivalent means,

What I claim as my invention, and desire to secure by Letters Patent, is—

The sieve $j$, when suspended by the four chains $i$, and so operated by the means hereinbefore described as to swing from side to side, and at each motion to strike the inner side of the frame A, as and for the purposes specified.

SAMUEL C. RUNDLETT.

Witnesses:
WILLIAM HENRY CLIFFORD,
HENRY C. HOUSTON.